United States Patent [19]
Turek

[11] 4,423,292
[45] Dec. 27, 1983

[54] DETECTOR CIRCUIT FOR COMMUNICATION LINES

[75] Inventor: Gregory J. Turek, Naperville, Ill.

[73] Assignee: Bell Telephone Laboratories, Incorporated, Murray Hill, N.J.

[21] Appl. No.: 306,943

[22] Filed: Sep. 30, 1981

[51] Int. Cl.³ .............................................. H04M 3/22
[52] U.S. Cl. ................................................. 179/18 FA
[58] Field of Search ....... 179/18 AH, 18 FA, 16 AA, 179/16 F; 340/825.06, 825.17, 825.09

[56] References Cited

U.S. PATENT DOCUMENTS

| | | | |
|---|---|---|---|
| 4,027,235 | 5/1977 | Macrander et al. | 323/48 |
| 4,056,691 | 11/1977 | Freimanis et al. | 179/18 FA |
| 4,099,032 | 7/1978 | Roge et al. | 179/18 FA |
| 4,110,565 | 8/1978 | Gaetano | 179/18 AH |
| 4,282,407 | 8/1981 | Stiefel | 179/18 FA |
| 4,289,933 | 9/1981 | Henry | 179/18 FA |
| 4,310,725 | 1/1982 | Mehaffey | 179/18 AH |
| 4,349,703 | 9/1982 | Chea, Jr. | 179/18 HB |

FOREIGN PATENT DOCUMENTS

| | | |
|---|---|---|
| 2520975 | 11/1976 | Fed. Rep. of Germany ........ 179/18 FA |
| 2851848 | 1/1980 | Fed. Rep. of Germany . |

*Primary Examiner*—Thomas W. Brown
*Attorney, Agent, or Firm*—R. J. Godlewski; P. Visserman

[57] ABSTRACT

A detector circuit for detecting the on-hook and off-hook states of a communication line includes current and voltage sensors for generating two reference signals. One signal represents the current flowing in the line; the other represents the voltage on the line. A comparator circuit compares these two references to generate an output signal representative of the on-hook state when the magnitude of one of the references is greater than the other. When the magnitude of the one reference signal is less than the other, the comparator circuit generates another output signal representative of the off-hook state of the line. In addition, when the line is electrically isolated from ground, the two comparator output signals may drive an opto-isolator to generate two corresponding output signals electrically isolated from the comparator output signals.

13 Claims, 4 Drawing Figures

DETECTOR CIRCUIT FOR COMMUNICATION LINES

TECHNICAL FIELD

The invention relates generally to communication line interface circuits for use in a switching office and, more particularly, to a detector circuit for detecting on-hook and off-hook states of the line.

BACKGROUND OF THE INVENTION

In telephone systems, trunk circuits serve as an interface between communication or, more particularly, transmission lines connected to a distant switching office and the switching network of a local telephone switching office. Historically, the receiving portion of a trunk circuit includes a battery circuit to supply power to the transmission line and a detector circuit to detect the high and low impedance levels of the line. These high and low impedance levels are frequently called the on-hook and off-hook states of the line, respectively, and are often used for supervisory and routing signaling on the line. The distant office may request use of the line by causing the line to assume the low impedance level or off-hook state. When the line is in the off-hook state, the battery circuit causes sufficient current flow in the line to operate the detector circuit at the switching network. After the initial off-hook state has been detected, the detector may be utilized for the detection of routing and further supervisory signals on the line.

Generally, standard battery circuits are designed for a maximum length line. For short lines, the standard battery circuit will tend to deliver an excessive amount of current. Elimination of high current consumption in short lines is desirable not only to protect the line apparatus but also to allow a reduction in power dissipation requirements of battery circuits and to reduce the generation of heat and the overall current consumption of the switching office. Battery circuits which provide a constant current to the line independent of the line length are well-known in the prior art.

Since the impedance of the line varies directly with the length of the line, a constant current battery circuit will supply a wide range of voltages. Operating within this wide range of voltages, detector circuits and the like commonly used in the current art have been able to detect state transitions of both long and short lines where the difference between the minimum on-hook (high) impedance of a short line and the maximum off-hook (low) impedance of a long line is large, such as, e.g., 24,000 ohms. This situation is commonly found in lines where the on-hook state presents an open circuit condition. However, in continuously terminated lines where the impedance difference may be minimal, such as, e.g., 400 ohms, the current art detector circuits cannot detect the difference in state between an on-hook short line and an off-hook long line.

SUMMARY OF THE INVENTION

A detector circuit in accordance with this invention detects both the on-hook and off hook states of a communication line substantially independent of the length of the line. The detector circuit comprises a current and a voltage sensor, which are coupled to the line and respond to the current in and the voltage on the line, respectively, for generating two reference signals. A comparator compares these two reference signals to generate two output signals. One output signal represents the on-hook state of the line when the magnitude of one of the reference signals is greater than the magnitude of the other. The other output signal represents the off-hook state of the line when the magnitude of the one reference signal is less than the magnitude of the other reference signal. In one illustrative embodiment of the invention, a resistor in a line electrically isolated from ground and two serially connected resistors connected across the line sense the current in and the voltage on the line, respectively, to generate two reference potentials. A comparator compares these two potentials to generate two output signals which represent the on-hook and off-hook states of the line. In addition, the two comparator output signals may drive an opto-isolator to generate two corresponding output signals electrically isolated from the comparator output signals.

Advantageously, in accordance with this invention, both the on-hook and off-hook states of an electrically isolated line can be detected substantially independent of line length with a single detector circuit.

BRIEF DESCRIPTION OF THE DRAWING

The invention may be better understood from the following detailed description when read with reference to the drawing in which.

DETAILED DESCRIPTION

Figure 1:
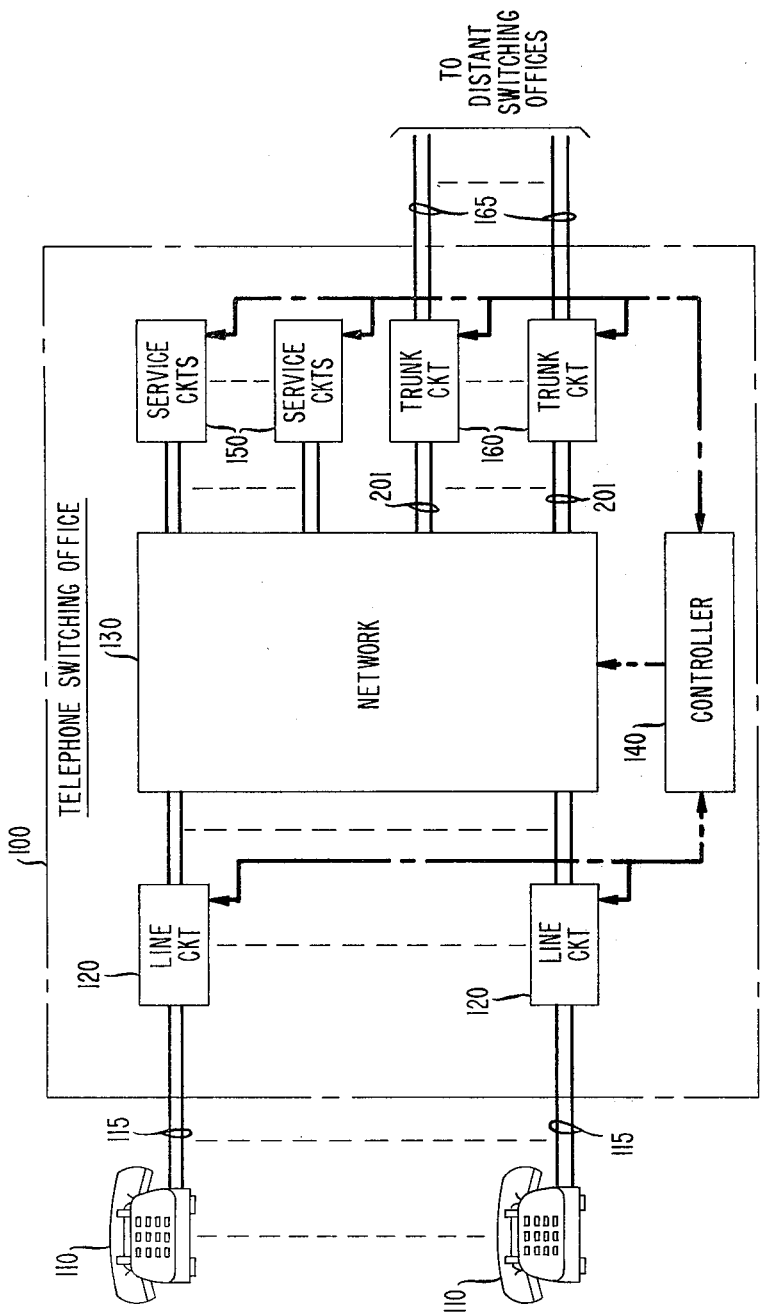
FIG. 1 is a representation of a telephone communication system in general block diagram form.

In an illustrative embodiment of this invention as depicted in the drawing and described herein, a plurality of telephone subscriber sets 110 are connected to a telephone switching office 100 by means of communication or, more particularly, subscriber lines 115. Telephone switching office 100 may also be connected to one or more distant switching offices by means of communication or, more particularly, transmission lines 165. By way of illustration, a switching office may comprise a switching network 130, a plurality of line circuits 120, service circuits 150, and trunk circuits 160, as well as a controller 140. As is customary, line circuits 120 provide an interface between subscriber lines 115 and switching network 130. Service circuits 150 generally include such circuits as signal pulse receivers, tone circuits, etc. Trunk circuits provide an interface with the switching network and transmission lines 165. The controller senses the operational state and activities of the line, service, and trunk circuits to detect certain signaling information, controls the network to establish connections between the various circuits, and manages the state of the circuits as required.

Figure 2:
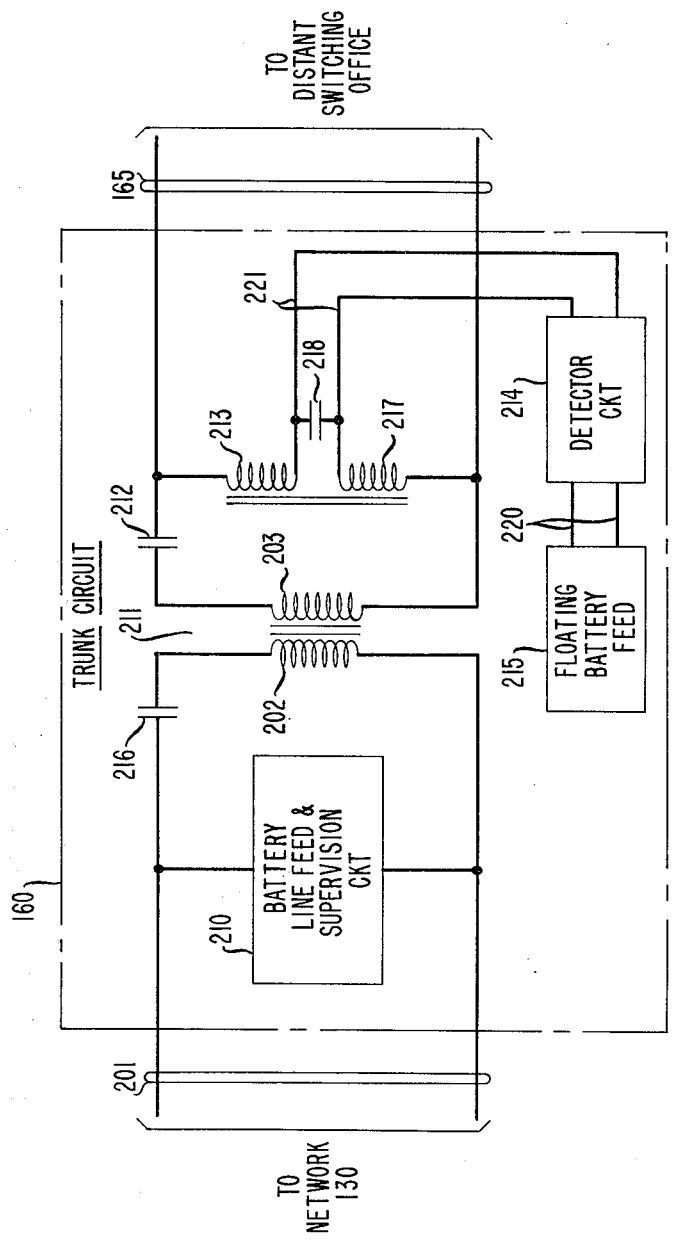
FIG. 2 shows a trunk circuit for use in a telephone communication system in accordance with the invention.

The details of trunk circuit 160 are depicted in FIG. 2 and are described next. The network side of trunk circuit 160 is connected to network 130 via a pair of network leads 201, and the transmission side is connected to a pair of transmission lines 165. The network leads and the transmission lines are magnetically coupled and electrically isolated by transformer 211. The transformer also electrically isolates the transmission lines from ground to minimize longitudinal currents which are frequently induced in the transmission lines by electrical power lines physically located in the vicinity. Primary winding 202 of the transformer is connected across network leads 201 through DC blocking capacitor 216, isolating the transformer from direct current flowing from battery line feed and the supervision circuit 210; secondary winding 203 is connected across transmission lines 165 via DC blocking capacitor 212, isolating the transformer from direct current flowing from floating battery feed 215.

On the network side of the trunk circuit is a well-known battery line feed and supervision circuit 210 which is connected across network leads 201. When the trunk circuit is connected to a subscriber line 115 through the network in a well-known manner, circuit 210 supplies power to the subscriber line and supervises its status, reporting on-hook and off-hook states to the switching system. In addition, the power supplied from circuit 210 may be electrically isolated from ground to reduce power consumption and longitudinal currents if the subscriber line has also been likewise isolated.

On the transmission side of the trunk circuit is detector circuit 214 which detects the on-hook and off-hook states of transmission lines 165, floating battery feed 215 which supplies power to the transmission lines, and inductors 213 and 217 which, along with capacitor 218, help prevent voice signal loss on the transmission lines. Detector circuit 214 has two output conductors 221 interconnected by capacitor 218 and connected to transmission lines 165 through inductors 213 and 217, respectively, and two input conductors 220 from battery feed 215. Floating battery feed 215 supplies power to the transmission lines through detector circuit 214 and inductors 213 and 217.

There are two types of transmission lines that should be mentioned, those in which the on-hook state is typically an open circuit and those that are continuously terminated. With the first type, the off-hook state or low impedance level of a long line may present an impedance of up to, for example, 6,000 ohms and for short lines, 1,800 ohms. Since the on-hook state or high impedance level for either short or long lines may be, for example, 30,000 ohms, the minimum difference between the high and low impedance levels may be, for example, as much as 24,000 ohms. In continuously terminated lines, the maximum off-hook (low) impedance of long lines may be, for example, 3,600 ohms and the minimum on-hook (high) impedance of short lines may be, for example, 4,000 ohms, leaving a difference of only 400 ohms between the high and low impedance levels. Prior art detection circuits designed to detect large differences in high and low impedances cannot detect the small differences that are characteristic of continuously terminated circuits. Detector circuit 214, on the other hand, is designed to detect the on-hook and off-hook states of both types of transmission lines regardless of their length and regardless of the minimal differences that may exist between their high and low impedance levels.

Figure 3:
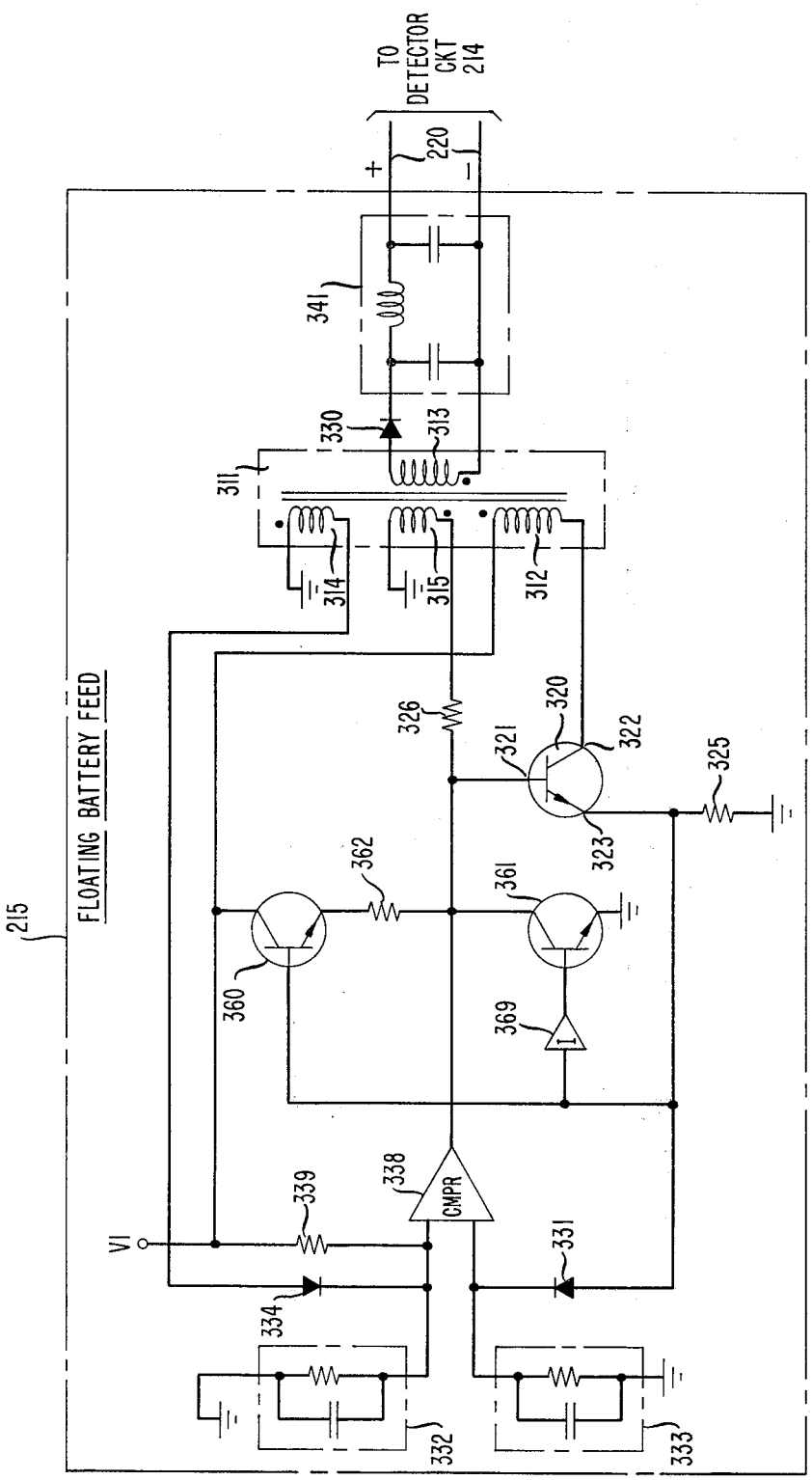
FIG. 3 shows a floating battery feed circuit for use with a trunk circuit in accordance with the invention.

The details of floating battery feed circuit 215 are shown in FIG. 3. The floating battery feed circuit comprises a transformer 311 having a primary coil 312, a secondary coil 313, and sense windings 314 and 315. Secondary coil 313 is connected to conductors 220 via diode 330 and an LC filter circuit 341. Current flow in primary coil 312 is controlled by means of transistor 320. Base current for transistor 320 may be supplied to conductor 321 from a DC power source designated by V1 through transistor 360 and resistor 362 or from sense winding 315 and resistor 326. The operation of transistor 320 may be inhibited by clamping conductor 321 to ground by means of transistor 361 or comparator circuit 338. The base drive to transistor 361 is cut off by inverter 369.

The base current supplied by transistor 360 will preferably be sufficient only to place the transistor 320 in the active state. When transistor 320 is in the active state, current will begin to flow in primary coil 312. This current will induce a voltage across feedback sense winding 315, supplying additional current to the base of transistor 320 through feedback resistor 326. The amount of current supplied to the base of transistor 320 must be sufficient to hold the transistor in saturation during the desired period of increasing current flow in primary coil 312. It will be recognized that the current supplying capacity of the feedback circuit is determined by the turns ratio of sense winding 315 to primary coil 312 and the value of feedback resistor 326.

As the transformer is charged, the current in primary coil 312 increases. The collector voltage as seen on conductor 322 drops to a near zero value and rises slowly as the voltage across emitter resistor 325 increases. Eventually, the collector current increases to such a value that the base current is insufficient to keep transistor 320 in saturation and the transistor will turn off abruptly. The transformer discharge cycle will be initiated at that time and secondary current will begin to flow through diode 330 and will steadily decrease. During the discharge cycle, a potential is induced across sense winding 315 which is opposite in polarity to the potential induced in the coil during the transformer charge cycle. The current supplied through transistor 360 will be relatively small (e.g., on the order of 1 milliampere) and resistor 326, connected between the base of transistor 320 and winding 315, may be on the order of 1000 ohms, causing a drop across the resistor on the order of 1 volt. The potential developed by sense winding 315 during the discharge cycle will ordinarily be several volts, causing a negative potential to be applied to base conductor 321. A potential will also be induced in sense winding 314 during the discharge cycle, causing RC circuit 332 to be charged through diode 334. The amount of charge on RC circuit 332 is a function of the potential induced in winding 314, which is a function of the output voltage produced across secondary coil 313, which in turn, depends on the output impedance across the line. In case of a high impedance, the discharged cycle will be relatively slow, but the output voltage will be large. As the output impedance decreases, the period required for discharge will increase, but output voltage will decrease. The charge across RC circuit 332, which is connected to one input terminal of comparator 338, will be increased or decreased accordingly, depending on the load impedance.

At the end of the discharge period, the negative polarity voltage induced across sense winding 315 will disappear and the base current will again flow to transistor 320, causing the transistor to be turned on. After the transistor has been turned on, the voltage across emitter resistor 325 will increase; the increase will be sensed at comparator 338 by means of the connection from emitter conductor 323 by way of diode 331 to comparator 338. The emitter resistor may be small. In one experimental circuit arrangement a 10-ohm resistor was found to be suitable. When the voltage across the resistor reaches a value greater than the charge across RC circuit 332, the comparator will clamp base conductor 321 to ground, causing transistor 320 to be turned off and the discharge cycle to be initiated once again. RC circuit 333 is connected to the comparator input terminal which senses the voltage across resistor 325. The purpose of this RC circuit is to function as a race elimination circuit. Without this circuit, a race condition may occur in which transistor 320 will be turned off and on in rapid succession.

In addition, it may be desirable to generate a high current output for short, low resistance lines, which may be used to produce voltages of a sufficient magnitude to operate apparatus at the distant switching office. This is accomplished by means of a bias voltage applied to the RC circuit 332 through resistor 339. The bias potential requires the voltage across the resistor 325 to rise to the bias value even when the transformer output as sensed in winding 314 is relatively low. Consequently, the transistor 320 will remain in the conducting state for a longer period of time than would normally occur without the bias, and a higher output current is produced. Since the bias is fixed, the effect of the bias will be most pronounced for very low impedance lines. As the impedance of the line increases, the output voltage of the circuit rises and the voltage across the RC circuit 332 eventually will exceed the bias potential and a constant current will be supplied thereafter.

Figure 4:
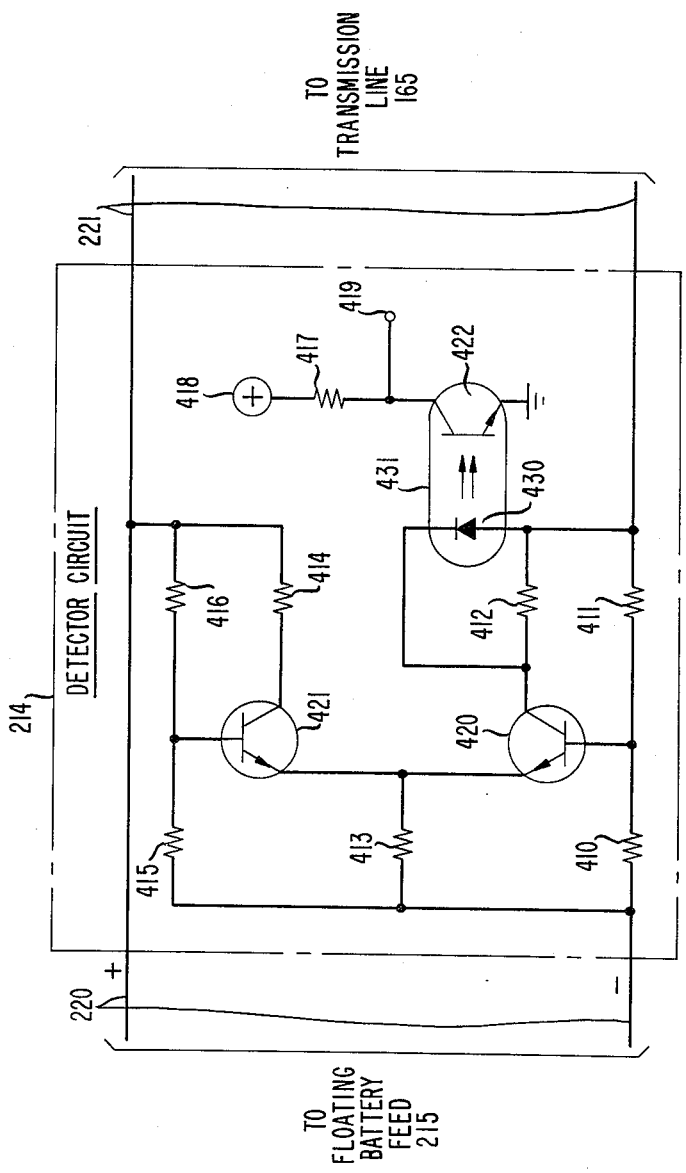
FIG. 4 shows in greater detail the detector circuit for use with a trunk circuit in accordance with one specific embodiment of the invention.

The details of detector circuit 214 are depicted in FIG. 4 and are described next. The detector circuit is connected to floating battery feed 215 via input conductors 220. The negative lead is connected to one of output conductors 221 via serially connected resistors 410 and 411, and the positive lead is directly connected to the other output conductor and resistor 416. The detector circuit may be divided into four major components: a voltage sensor, a current sensor, a comparator, and an opto-isolator. Connected in series with the line, the current sensor, resistor 410, generates a reference signal or potential representing the current in the line. Connected in series across the line, resistors 415 and 416 act as a voltage sensor generating a second reference signal or potential representing the voltage applied by battery feed 215 to the line which may range, for example, from 30 to 110 volts. Emitter-connected, switching transistors 420 and 421 and current-limiting resistors 412, 413, and 414 are connected to function as a well-known comparator circuit comparing the reference signals from the current sensor and the voltage sensor.

When the magnitude of the reference signal from the voltage sensor is greater than the magnitude of the reference signal from the current sensor, the output signal from the comparator taken across collector resistor 412 will assume a level indicative of the on-hook state or high impedance level of transmission line 165. The output signal could also be taken across collector resistor 414, although at a level different from that across resistor 412. Transistors 420 and 421 will be in well-known OFF and ON states, respectively, the voltage across emitter resistor 413 being developed by the current flowing from transistor 421. It is assumed that the gain of transistor 421 is such that only a minimum amount of current is supplied through the base. The value of resistor 414 must be such that transistor 421 will not saturate with the highest voltage applied to the base while the power dissipated by transistor 421 is kept to a minimum. With transistor 420 OFF, no current flows through collector resistor 412 which is connected to one of conductors 221.

When the magnitude of the reference signal from the voltage sensor is less than the magnitude of the reference signal from the current sensor, the output signal will assume a level indicative of the off-hook state or low impedance level of transmission line 165. Transistors 420 and 421 will be in ON and OFF states, respectively, the voltage across emitter resistor 413 being developed by the current flowing from transistor 420. The voltage drop, for example, 2 or 3 volts, across resistor 411, which is connected between collector resistor 412 and the base of transistor 420, must be enough to forward bias light-emitting diode (LED) 430. Collector resistor 412 causes several hundred microamps to flow through transistor 420 before any current flows through LED 430, thus sensitivity to variations in opto-isolator 431 gain can be minimized. The value for resistor 413 must be small enough to ensure that opto-isolator 413 will operate in an off-hook state, but large enough to minimize error due to differences between the base-emitter voltage drop of transistors 420 and 421.

Opto-isolator 431 comprises LED 430 optically coupled to the photodetector or, more particularly, phototransistor 422 and electrically isolates the comparator output signals from the detector output signals, as well as ground. The collector of phototransistor 422 is connected to positive potential source 418 via current limiting resistor 417 and to detector circuit output terminal 419, the emitter being connected to ground. When the line is in the off-hook state, the detector output signal on terminal 419 assumes a low logic level. By design choice, the output signal could just as easily assume a high logic level for the off-hook state with minor circuit modifications. Current flowing through LED 430 causes the LED to generate an optical signal to phototransistor 422. Phototransistor 422 conducts current, causing terminal 419 to assume the low logic level. The detector output signal may then be used to drive one of any number of well-known scanning devices for signaling the off-hook status of the line to controller 140. Conversely, when the line is in the on-hook state, the detector output signal assumes a high logic level with no current flowing through LED 430 and phototransistor 422.

As previously described, the detector circuit comprises a current sensor, a voltage sensor, a comparator, and an opto-isolator. However, the detector circuit can also be described in terms of a well-known four-legged impedance bridge circuit with the impedance of the transmission line and resistor 411 constituting the unknown leg and resistors 410, 415, and 416 with known impedances, each constituting one of the other three legs. The bridge circuit comprises four impedance legs and, as previously described, a comparator circuit and an opto-isolator for electrically isolating the output signals.

As is well-known, the three known legs of a bridge define the unknown when the bridge is at a nullity, that is, when the magnitude of the two signals applied to the comparator circuit are equal. Accordingly, resistors 410, 415, and 416 are selected to define a threshold impedance somewhere between the maximum off-hook (low) impedance of a long line and the minimum on-hook (high) impedance of a long line. Thus, when either a long or a short line presents a low impedance level, the magnitude of the potential applied to transistor 420 is greater than that applied to transistor 421, and the output signal taken across resistor 412 will assume a level indicative of the off-hook state, as previously described, in conjunction with the comparator circuit. Conversely, when the line presents a high impedance level, the magnitude of the potential applied to transistor 420 is less than that applied to transistor 421. Appropriately, the output signal assumes another level indicative of the on-hook state.

It is to be understood that the above described arrangement is merely an illustrative application of the principles of the invention and that numerous other arrangements may be devised by those skilled in the art without departing from the spirit and scope of the invention. It is also to be understood that although the illustrative embodiment of this invention was utilized with a transmission line it could just as easily be used to detect the on-hook and off-hook states of a subscriber line without departing from the spirit and scope of the invention.

What is claimed is:

1. A detector circuit for detecting on-hook and off-hook states of a communication line electrically isolated from ground; said circuit comprising:
    current sensor means electrically isolated from ground and responsive to current in said line for generating a first reference signal;
    voltage sensor means electrically isolated from ground and responsive to voltage on said line for generating a second reference signal, said reference signals being of like kind; and
    comparator means electrically isolated from ground for comparing said reference signals to generate a first output signal representative of said on-hook state when the magnitude of one of said reference signals is greater than the magnitude of the other and a second output signal representative of said off-hook state when the magnitude of said one of said reference signals is less than the magnitude of the other.

2. A detector circuit in accordance with claim 1 in which said circuit further comprises isolator means responsive to said first output signal for generating a third output signal and responsive to said second output signal for generating a fourth output signal, said third and fourth output signals being electrically isolated from said first and second output signals.

3. A detector circuit in accordance with claim 2 in which said isolator means comprises a light-emitting device connected to said comparator means and a photodetector optically coupled to said light-emitting device.

4. A detector circuit for detecting on-hook and off-hook states of a communication line comprising:
    a first resistor connected in said line and responsive to current in said line for generating a first reference signal;
    second and third resistors connected in series across said line and responsive to voltage on said line for generating a second reference signal, said reference signals being of like kind; and
    comparator means for comparing said reference signals to generate a first output signal representative of said on-hook state when the magnitude of one of said reference signals is greater than the magnitude of the other and a second output signal respresentative of said off-hook state when the magnitude of said one of said reference signals is less than the magnitude of the other.

5. A detector circuit in accordance with claim 4 in which said comparator means comprises a pair of interconnected transistors, the base of one of said transistors being connected to said first resistor, the base of the other of said transistors being connected to said second and third resistors.

6. A detector circuit in accordance with claim 4 or 5 in which said circuit further comprises isolator means responsive to said first output signal for generating a third output signal and responsive to said second output signal for generating a fourth output signal, said third and fourth output signals being electrically isolated from said first and second output signals.

7. A detector circuit in accordance with claim 6 in which said isolator means comprises a light-emitting device connected to said comparator means and a photodetector optically coupled to said light-emitting device.

8. A detector circuit for detecting on-hook and off-hook states of a communication line comprising:
    first and second input terminals connectable to a power supply;
    first and second output terminals, said line interconnecting said first output and said second input terminals;
    a first impedance connected between said first input and output terminals;
    a second impedance connected between said first input and said second output terminals;
    a third impedance connected between said second input and said second output terminals; and
    a comparator means connected to said output terminals for generating a first output signal representative of said on-hook state when the ratio of said first impedance and the impedance of said line is less than the ratio of said second and third impedances and a second output signal representative of said off-hook state when the ratio of said first impedance and the impedance of said line is greater than the ratio of said second and third impedances.

9. A detector circuit for detecting on-hook and off-hook states of a communication line electrically isolated from ground; said circuit comprising:
    first and second input terminals connectable to a power supply having an output stage electrically isolated from ground;
    first and second output terminals, said line interconnecting said first output and said second input terminals;
    a first impedance connected between said first input and output terminals;
    a second impedance connected between said first input and said second output terminals;
    a third impedance connected between said second input and output terminals; and
    comparator means connected to said output terminals and electrically isolated from ground for generating a first output signal representative of said on-hook state when the ratio of said first impedance and the impedance of said line is less than the ratio of said second and third impedances and a second output signal representative of said off-hook state when the ratio of said first impedance and the impedance of said line is greater than the ratio of said second and third impedances.

10. A detector circuit in accordance with claim 8 or 9 in which said circuit further comprises isolator means reponsive to said first output signal for generating a third output signal and responsive to said second output signal for generating a fourth output signal, said third and fourth output signals being electrically isolated from said first and second output signals.

11. A detector circuit in accordance with claim 10 in which said isolator means comprises a light-emitting device connected to said comparator means and a photodetector optically coupled to said light-emitting device.

12. A detector circuit in accordance with claim 11 in which said comparator means comprises a pair of interconnected transistors, the base of one of said transistors being connected to said first impedance, the base of the other of said transistors being connected to said second and third impedances.

13. A detector circuit for detecting on-hook and off-hook states of a communication line comprising:

current sensor means coupled to said line and responsive to current in said line for generating a first reference signal;

voltage sensor means coupled to said line and responsive to voltage on said line for generating a second reference signal, said reference signals being of like kind;

comparator means for comparing said reference signals to generate a first output signal representative of said on-hook state when the magnitude of one of said reference signals is greater than the magnitude of the other and a second output signal representative of said off-hook state when the magnitude of said one of said reference signals is less than the magnitude of the other; and isolator means responsive to said output signal for generating a third output signal and responsive to said second output signal for generating a fourth output signal, said third and fourth output signals being electrically isolated from said first and second output signals.

* * * * *